United States Patent [19]

Yoshida et al.

[11] Patent Number: 5,065,440
[45] Date of Patent: Nov. 12, 1991

[54] PATTERN RECOGNITION APPARATUS

[75] Inventors: Naoko Yoshida, Yokohama; Yoshinori Takizawa, Tokyo, both of Japan

[73] Assignee: Eastman Kodack Company, Rochester, N.Y.

[21] Appl. No.: 571,364

[22] Filed: Aug. 23, 1990

[30] Foreign Application Priority Data

Mar. 9, 1990 [JP] Japan ................................. 2-58736

[51] Int. Cl.⁵ ............................................. G06K 9/62
[52] U.S. Cl. ......................................... 382/30; 382/34; 382/42
[58] Field of Search ...................... 382/308, 34, 42, 47, 382/41, 49; 364/728.03, 728.04; 358/101, 401, 448; 340/730, 731

[56] References Cited

U.S. PATENT DOCUMENTS

| 4,543,660 | 9/1985 | Maeda | 382/34 |
| 4,630,308 | 12/1986 | Hongo | 382/34 |
| 4,677,680 | 6/1987 | Harima et al. | 382/34 |
| 4,809,341 | 2/1989 | Matsui et al. | 382/30 |
| 4,864,629 | 9/1989 | Deering | 382/34 |
| 4,872,024 | 10/1989 | Nagai et al. | 382/34 |
| 4,905,296 | 2/1990 | Nishihara | 382/42 |

Primary Examiner—Michael Razavi
Attorney, Agent, or Firm—Raymond L. Owens

[57] ABSTRACT

A pattern recognition apparatus is capable of high-speed, automatic recognition of input images with a high degree of accuracy. The apparatus has an extended range of tolerance to shifts in the relative position of the input images and provides insensible regions about reference patterns which are shifted horizontally.

3 Claims, 4 Drawing Sheets

PATTERN RECOGNITION APPARATUS

BACKGROUND OF THE INVENTION

1. Field of the Invention

The present invention relates to pattern recognition in which an input image is compared with a multiplicity of predetermined reference patterns.

2. Description of the Prior Art

In pattern recognition, an image read by an image reading apparatus is processed to determine the position, attitude, shape and other such geometric features of an object. With pattern recognition capability becoming an essential part of visual systems in the areas of robotics and computer vision.

Pattern matching is a fundamental technique in the practical implementation of pattern recognition systems. It involves comparing an input image pattern with a multiplicity of preset reference patterns and selecting the reference pattern which is the closest match to the input image.

This selection of the reference pattern which offers the closest match is based on an evaluation parameter. This parameter is obtained by computing the degree of the correlation existing between the input image pattern and the reference pattern. The larger the number of matched pixels, or the smaller the number of unmatched pixels, the larger this correlation value becomes. Therefore, even if there is a reference pattern that is the same as the input image pattern, any relative positional shift between the two patterns will give rise to a decrease in the number of matched pixels, or ar increase in the number of unmatched pixels, and hence a decrease in the value of the evaluation parameter, i.e., the correlation value. The end result of this is the execution of erroneous recognition in which the two patterns are judged to be the same.

Various methods have been proposed to prevent this recognition error. Representative of such methods is one in which the input image pattern is compared with the reference patterns, and if they do not match the input image is incrementally shifted vertically and horizontally to other positions and the correlation between input image pattern and reference pattern is again obtained, the maximum value thus obtained being used as the correlation value of the input image and reference pattern. A drawback with this method is the large number of calculations it requires, which adds considerably to the time required to effect the recognition.

To ensure accurate detection of the position of the input image pattern, prior to obtaining the correlation value positional information on the input image pattern may be acquired using information such as pattern contour and center, and this information used to optimize the position of the input image pattern. However, one problem with this method is that it requires that the position of the input image be detected, which makes it difficult to apply to high-speed recognition. A further problem is that a positional detection section becomes an essential element of the pattern recognition apparatus, which increases the complexity and cost of the system.

SUMMARY OF THE INVENTION

In view of the problems with conventional systems described above, the object of the present invention is to provide a pattern recognition apparatus capable of high-speed, automatic recognition of input image patterns with a high degree of accuracy and which also enables the allowable range for the positional shifts of the input image pattern to be greatly extended.

To attain this object, the pattern recognition apparatus according to the present invention comprises first storage means for storing second reference pixel data of second reference patterns formed by providing an insensible region along the contour of a reference pattern, second storage means for storing third reference pixel data of third reference patterns which are second reference patterns shifted horizontally by a prescribed pixel amount, comparison means for comparing input image pattern pixel data with pixel data stored in the first and second storage means other than insensible region pixel data, correlation value calculation means for calculating the degree of correlation between the input image pattern and the reference patterns based on the result of the comparison by the comparison means, and specification means which uses the correlation value calculated by the correlation value calculation means to specify the input image pattern to one of the multiple reference patterns.

In the pattern recognition apparatus configured according to this arrangement, insensible regions (of width W) are provided along reference pattern contours, these insensible regions being areas which are not counted either as matched areas or unmatched areas. In addition, third reference patterns are stored beforehand which are these second reference patterns horizontally shifted by a prescribed pixel amount, for example $(W+1) \times n$, where n is an integer, and the input image pattern is compared with these second and third reference patterns. Specifically, in comparing, using comparison means, input image pixel data with pixel data of the second reference patterns which are provided with this insensible region and are stored in the first storage means and pixel data of third reference patterns stored in the second storage means which are the second reference patterns horizontally shifted by a prescribed pixel amount, pixel data of the insensible region is not included in the comparison process.

By thus comparing the input image pattern with second reference patterns provided with the insensible region and third reference patterns which are the second reference patterns horizontally shifted by a prescribed pixel amount, and using calculation means to obtain a correlation value between the input image pattern and the reference patterns, any relative positional shift between input image pattern and reference pattern can be absorbed by the insensible region, raising recognition accuracy. In addition, comparison between an input image which shifts by a prescribed pixel amount, and the third reference patterns speeds up the recognition process by reducing the number of pattern matching iterations.

Further features of the invention, its nature and various advantages will be more apparent from the accompanying drawings and following detailed description of the invention.

DETAILED DESCRIPTION OF THE INVENTION

Figure 1:
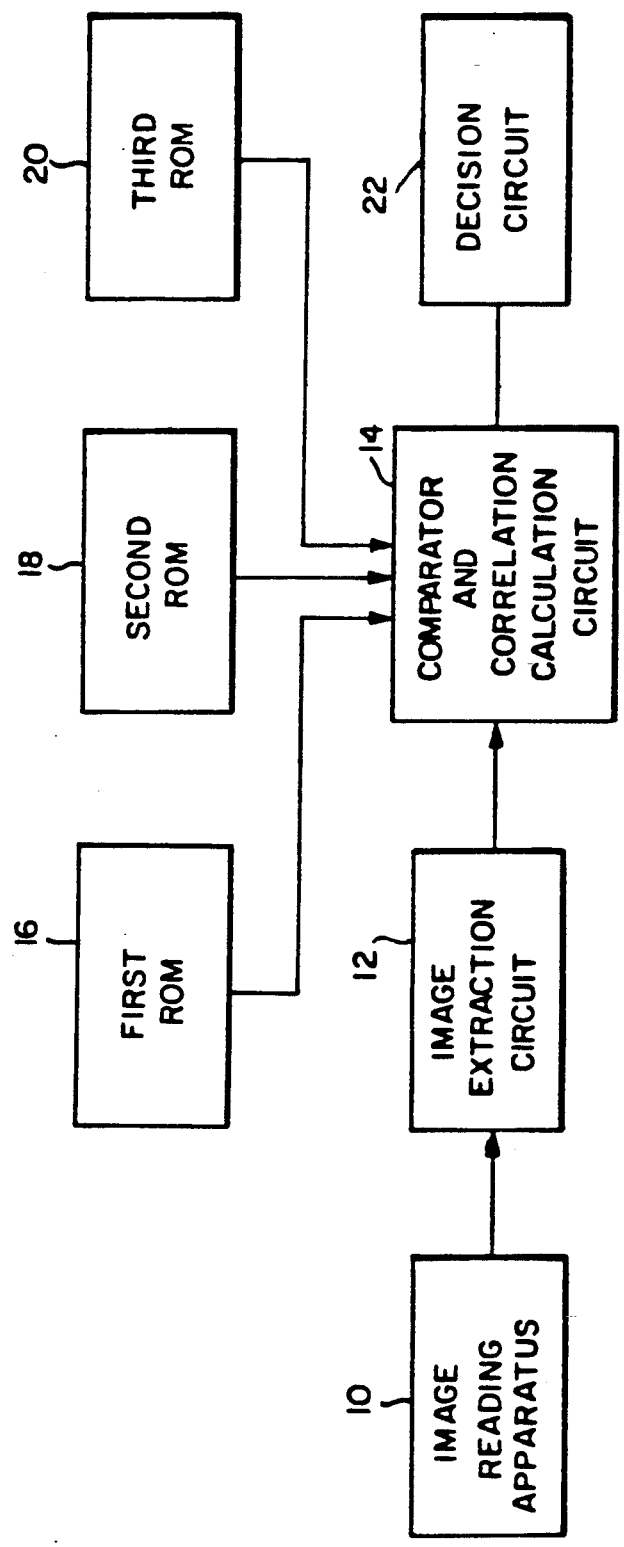
FIG. 1 is a schematic drawing showing the configuration of a pattern recognition apparatus according to a first embodiment of the present invention.

FIG. 1 shows the configuration of a first embodiment of the present invention. With reference to the drawing, a video camera equipped with a solid-state imager such as a CCD element, for example, forms an image reading apparatus 10. When the CCD is configured as a two-dimensional array of M×N CCD elements the image reading apparatus 10 outputs M×N pixel information corresponding to the CCD imager elements. This information is input to an image extraction circuit 12 which extracts only those prescribed pixels which match a predetermined reference pattern as described below. When the input image pattern is a drawing, it is not necessary to position the drawing in the center of the extracted image, so it is not necessary to use a position detection circuit for detecting the position of the drawing. The extracted image information is then input to a comparator and correlation calculation circuit 14.

The apparatus is configured so that the comparator and correlation calculation circuit 14 also receives pixel data from a first ROM 16, second ROM 18 and third ROM 20.

Figure 2A:
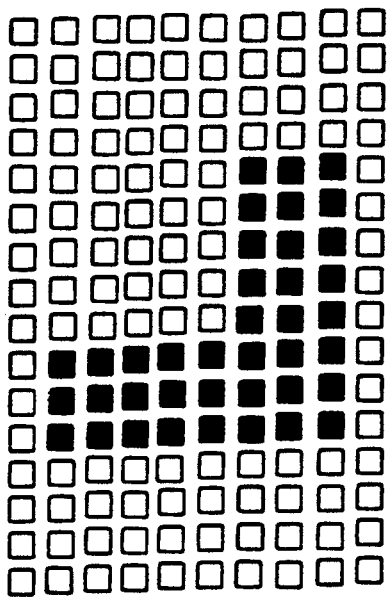
FIG. 2 shows explanatory diagrams of reference patterns in the case of the first embodiment.

Details of the pixel data stored in the first ROM 16, second ROM 18 and third ROM 20 will now be described with reference to FIG. 2. FIG. 2A shows the pixel data of one reference pattern according to this embodiment. The pattern is comprised of 160 pixels arranged in a grid measuring 16 pixels horizontally by 10 pixels vertically, with each pixel binarized to black or white. In this reference pattern, only the pixels in the L-shaped region are black level data.

Figure 2B:
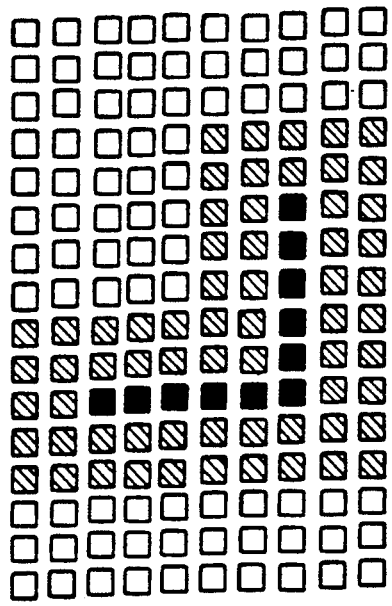

FIG. 2B shows a second reference pattern formed by providing an insensible region ±one pixel in extent along the contour of the reference pattern shown in FIG. 2A, indicated in the drawing by hatching.

Figure 2C:
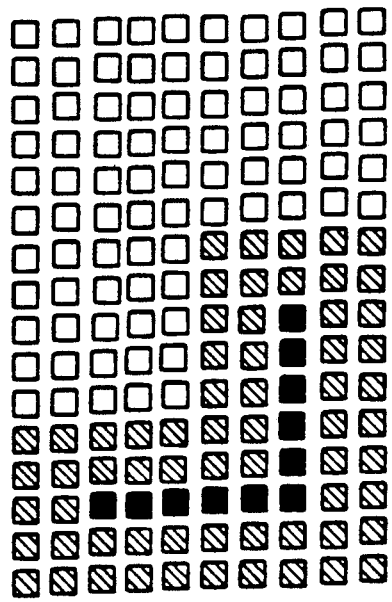
Figure 2D:
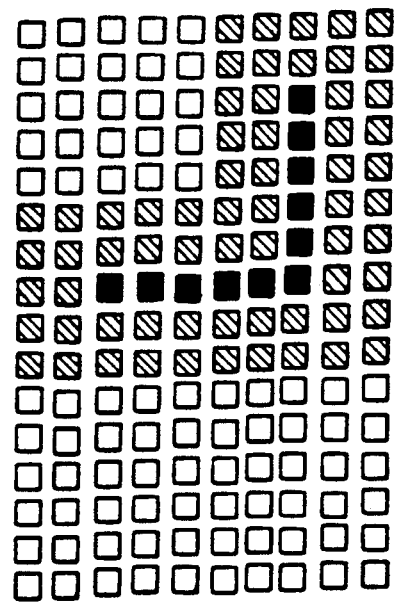

FIG. 2C shows a third reference pattern which is formed by shifting the second reference pattern of FIG. 2B horizontally to the left by three pixels, while FIG. 2D shows a fourth reference pattern which is formed by shifting the second reference pattern of FIG. 2B horizontally to the right by three pixels. The pixel data of the reference patterns shown in FIGS. 2B to 2D is stored in the respective first ROM 16, second ROM 18 and third ROM 20. The data can be stored by specifying addresses corresponding in a one-to-one relationship to the 160 pixels of each pattern, with each data item being stored as a black (0) or white (1) binary value. Pixel data corresponding to pixels located in the insensible region can be stored at a prescribed address in each ROM as binary 1 data, signifying that pixels in that area are insensible region pixels, or can be stored in a ROM (not shown) specifically provided for the insensible region. The pixel data stored in the first ROM 16, second ROM 18 and third ROM 20 is input to the comparator and correlation calculation circuit 14 where the pixel data is compared with input image pixel data from the image extraction circuit 12.

Figure 3:
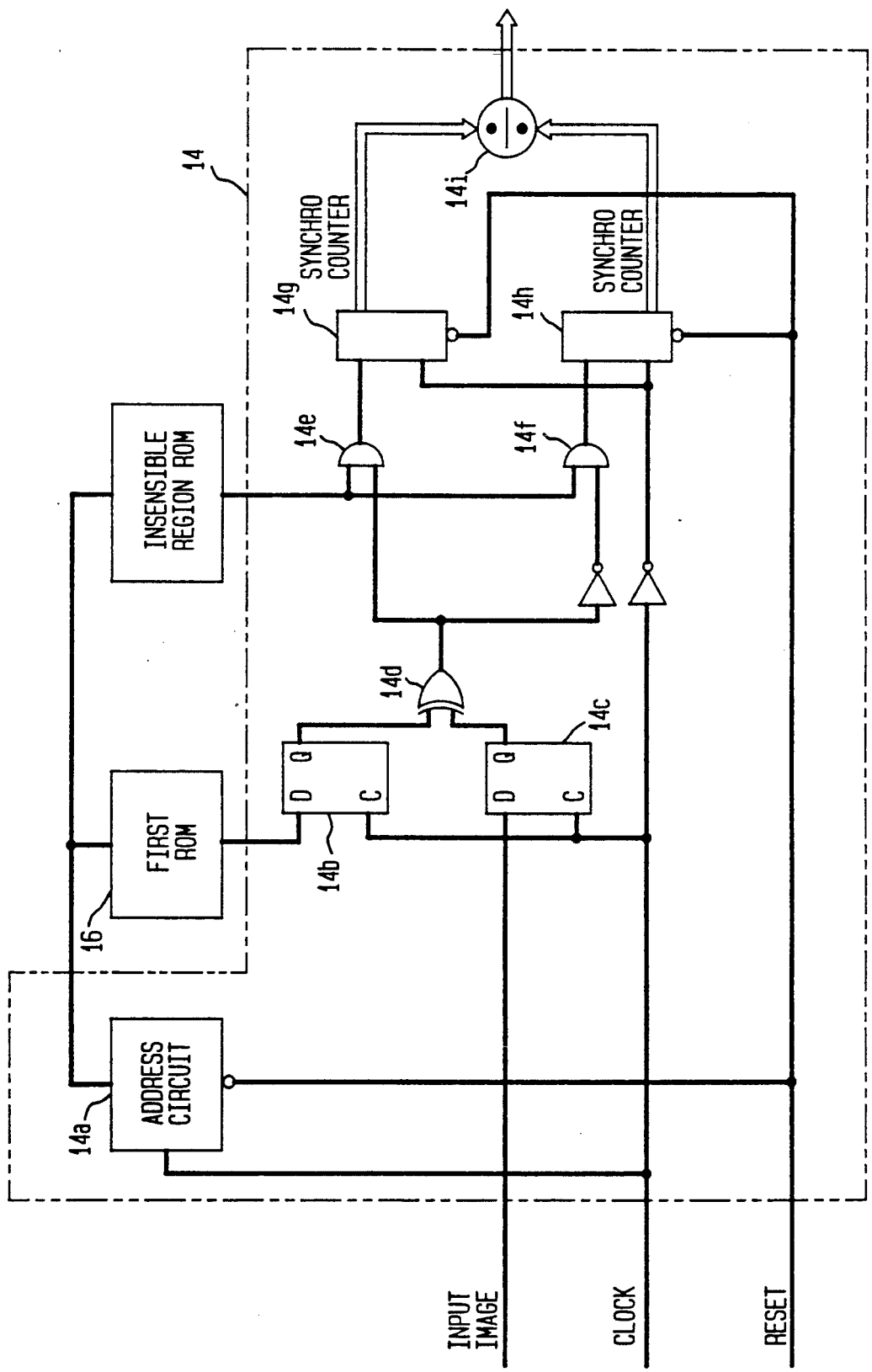
FIG. 3 is a circuit diagram of a comparator and correlation value calculation circuit of the same embodiment.

FIG. 3 is a circuit diagram of the comparator and correlation calculation circuit 14. The comparator and correlation calculation circuit 14 is constituted by an address circuit 14a which controls the read-out of data from the ROMS, D type flip-flops 14b and 14c which receive the input of data read out of the ROMs and input image pattern pixel data, an Exclusive Or gate 14d which receives the Q output of the D type flip-flops 14b and 14c, and gates 14e and 14f which receive the outputs of the Exclusive Or gate 14d and pixel data read out from the insensible region ROM, and synchro counters 14g and 14h which count output values from the And gates 14e and 14f. The comparator and correlation calculation circuit 14 compares pixel data stored in ROM with input image pattern pixel data and calculates the ratio of matched pixels to unmatched pixels.

The operation of the apparatus thus configured will now be described with reference to the first ROM 16 in which is stored pixel data of the second reference patterns. The address circuit 14a is reset by a reset pulse and the address is incremented by a clock pulse and pixel data read out from the ROM 16 is input to the D terminal of the D type flip flop 14b.

Input image pattern pixel data is input to the D terminal of the D type flip-flop 14c and the phase of the flip-flops 14b and 14c are synchronized by a clock signal input to the clock terminal C of each of the flip-flops 14b and 14c, and the data is then output to the Exclusive Or gate 14d. The output side of the Exclusive Or gate 14d goes to logical level 0 when each of the two inputs have the same logical value and to logical level 1 when the inputs have different logical values. Thus, the output of the Exclusive Or gate 14d will only assume a logical 1 state when the output from the flip-flop 14c which receives the input image pixel data and the output from the D type flip-flop 14b which receives the second reference pattern pixel data stored in the ROM 16 are different. The output of the Exclusive Or gate 14d is input to one of the input terminals of the And gates 14e and 14f (inverted). The data read out from the insensible region pixel data ROM is input to the other input terminals of the And gates 14e and 14f. When the address specified by the address circuit 14a corresponds to insensible region pixel data a 0 level is input, while a 1 level is input when any other address is specified. Therefore, when pixel data which is to be compared with input image pattern pixel data is insensible region pixel data, the outputs of the And gates 14e and 14f will remain at 0 and will not be counted by the synchro counters 14g and 14h.

When the pixel data is not insensible region pixel data, unmatched pixels are counted by the synchro counter 14g and matched pixels by the synchro counter 4h. The comparator and correlation calculation circuit 14 divides the output of the synchro counter 4h by the output of the synchro counter 14g, in correlation value calculation means 14a thus (number of matched pixels)/(number of unmatched pixels) is output. When the input image pattern substantially matches the second reference pattern stored in the ROM 16, the denominator will be small and the numerator large, making the resultant value of this calculation larger, and it can therefore be used as a correlation value indicating the degree to which the two patterns match.

Following this comparison of pixel data and the calculation of the correlation value, the address circuit 14a is used to read out pixel data from the second ROM 18 and third ROM 20, and the two sets of pixel data are compared to calculate a correlation value.

The pixel data stored in the first ROM 16, second ROM 18 and third ROM 20 are then each treated as matching the reference pattern shown in FIG. 2A. That is, even when the input image pattern matches the reference pattern of FIG. 2A and the relative positions differ by ±4 pixels in the horizontal direction, any of the sets of pixel data in the ROM 16 (FIG. 2B), ROM 18 (FIG. 2C) and ROM 20 (FIG. 2D) can be used to make the number of unmatched pixels virtually 0, so that the same correlation value can be obtained as when there is no relative positional shift between input image pattern and the reference patterns.

The correlation value thus calculated by the comparator and correlation calculation circuit 14 is input to a decision circuit 22. The same process of comparison and calculation of a correlation value is applied to each of the other reference patterns, and each value is input to the decision circuit 22.

The decision circuit 22 may be constituted by a comparator which compares the correlation values of the input reference patterns and outputs the maximum value, thereby selecting the reference pattern closest to the input image pattern.

Thus, in accordance with this embodiment, an insensible region of width W is provided along the contour of a reference pattern, the reference pattern is shifted horizontally by a pixel amount $(W+1) \times n$, where n is an integer, so that even if a relative positional discrepancy amounting to $(W+1) \times n + W/2$ pixels arises between the input image and the reference pattern, the same result can be obtained as when there is no such discrepancy, enabling pattern recognition of input images to be implemented with an extended range of tolerance.

While the description of the embodiment uses the example of a relative horizontal difference between the input image and reference patterns, vertical differences can also be covered by ROM storage of comparison reference patterns which, relative to the predetermined reference pattern, are offset vertically by a prescribed pixel amount, thereby extending the allowable range of pattern recognition vertically as well as horizontally.

The invention is not limited to the circuit arrangement which, as shown in FIG. 3, counts matched and unmatched pixels and calculates the ratio between the two counts. Other arrangements which may be used without departing from the scope of the invention include a circuit configuration for calculating minimum error, or the spatial distance [f−g], where f is the input image pattern vector and g is the reference pattern vector).

Figure 4:
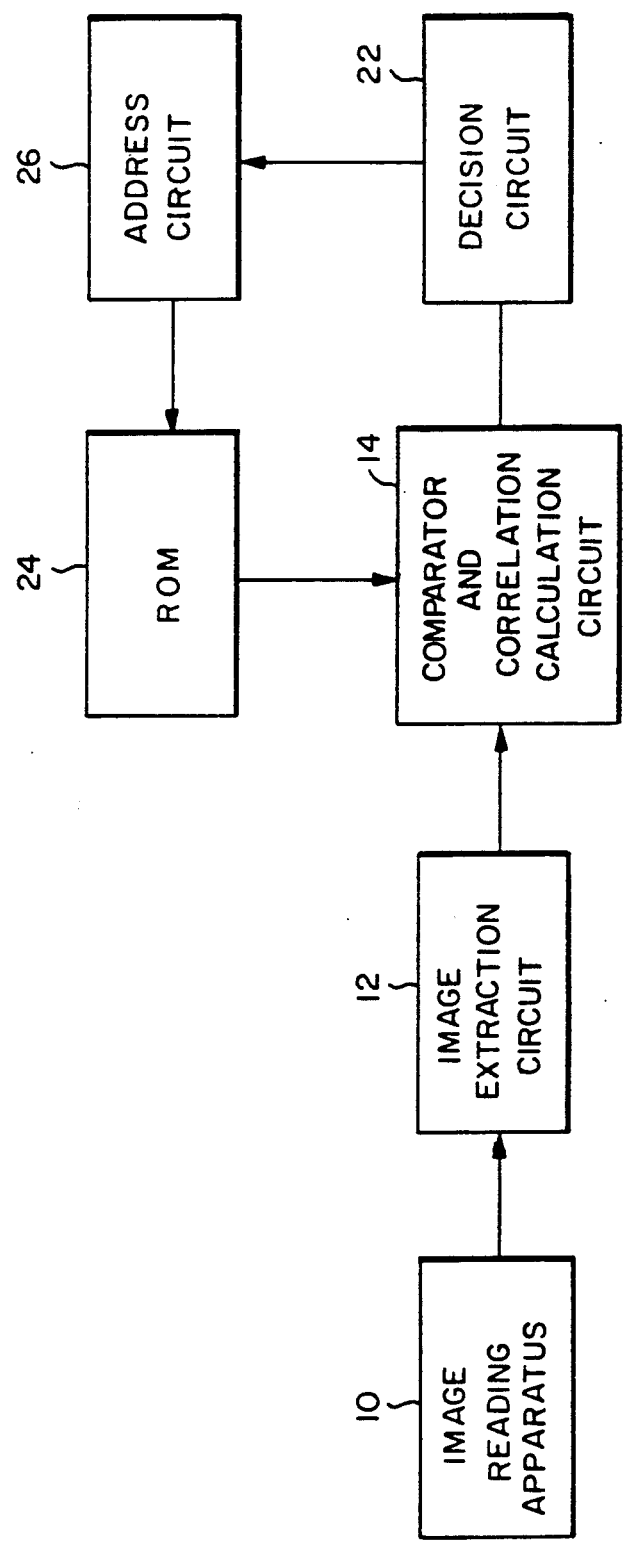
FIG. 4 is a schematic drawing of the arrangement of another embodiment of a pattern recognition apparatus according to the present invention.

Moreover, while the second, third, and fourth reference patterns shown in FIGS. 2B to 2D are in separate ROMs, an arrangement such as the one shown in FIG. 4 may be used in which the pixel data of the reference patterns is stored in a single ROM 24, and this pixel data is read out when required by an address circuit 26 for input to the comparator and correlation calculation circuit 14. In this case, the speed of the process can be increased by first comparing the input image pixel data with the second reference pattern pixel data and calculating a correlation value, and only going to the third reference pattern pixel data when the maximum correlation value obtained by the decision circuit 22 is found to be not large enough.

It is to be understood that although the input image pattern is depicted as being an "L", it may of course be any alphanumeric character. Also, the calculation of correlation values does not have to be limited to the method illustrated in FIG. 3. Instead, maximum unmatched pixels and other such methods in general use for pattern recognition may be used.

The invention has been described in detail with particular reference to certain preferred embodiments thereof, but it will be understood that variations and modifications can be effected within the spirit and scope of the invention.

What is claimed is:

1. A pattern recognition apparatus in which pattern recognition is based on a comparison of an input image with predetermined multiple reference patterns comprising:

first storage means for storing second reference pixel data of second reference patterns formed by providing an insensible region of ±W pixels around a contour of each of the predetermined multiple reference pattern, wherein W is an integer greater than zero;

second storage means for storing third reference pixel data of third reference patterns which are second reference patterns shifted horizontally by a prescribed pixel amount;

comparison means for comparing input image pattern pixel data with pixel data stored in the first and second storage means other than insensible region pixel data;

correlation value calculation means for calculating the degree of correlation between an input image pattern and reference based on the result of the comparison by the comparison means; and decision means which uses the correlation value calculated by the correlation value calculation means to specify the input pattern to one of the multiple reference patterns.

2. Pattern recognition apparatus of claim 1 further including third storage means for storing fourth reference pixel data of fourth reference patterns which are second reference patterns shifted horizontally by a prescribed pixel amount in a direction opposite to the shifted direction of the third reference patterns and wherein the comparison means further compares input image pattern data with data stored in the fourth storage means.

3. The pattern recognition apparatus of claim 1 where the insensible region is ±1 pixel around the contour of each of the predetermined multiple reference patterns.

* * * * *